(12) United States Patent
Sahoo et al.

(10) Patent No.: US 12,229,026 B2
(45) Date of Patent: Feb. 18, 2025

(54) REPLICATING RESOURCES BETWEEN REGIONAL DATA CENTERS

(71) Applicant: Oracle International Corporation, Redwood Shores, CA (US)

(72) Inventors: Sanjeeb Kumar Sahoo, Pleasanton, CA (US); Rajesh Desai, Santa Clara, CA (US); Graham Bromley, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 148 days.

(21) Appl. No.: 17/974,369

(22) Filed: Oct. 26, 2022

(65) Prior Publication Data

US 2024/0143459 A1    May 2, 2024

(51) Int. Cl.
| | |
|---|---|
| *G06F 11/00* | (2006.01) |
| *G06F 9/445* | (2018.01) |
| *G06F 11/16* | (2006.01) |
| *G06F 11/20* | (2006.01) |

(52) U.S. Cl.
CPC ...... *G06F 11/2025* (2013.01); *G06F 9/44505* (2013.01); *G06F 11/1658* (2013.01)

(58) Field of Classification Search
CPC ............ G06F 11/1658; G06F 11/1662; G06F 11/2023–2051; G06F 11/2053; G06F 11/2056; G06F 11/2069; G06F 11/2082; G06F 11/2094; G06F 11/2097
See application file for complete search history.

(56) References Cited

U.S. PATENT DOCUMENTS

| | | | |
|---|---|---|---|
| 8,041,986 B2 * | 10/2011 | Hatasaki | G06F 11/2033 |
| | | | 714/4.11 |
| 9,152,686 B2 | 10/2015 | Whitehead et al. | |
| 10,585,766 B2 * | 3/2020 | Taranov | G06F 11/2038 |

(Continued)

FOREIGN PATENT DOCUMENTS

EP    3037966 A1    6/2016

OTHER PUBLICATIONS

Azurerm_Site_Recovery_Replication_Policy, Available online at: https://registry.terraform.io/providers/hashicorp/azurerm/latest/docs/resources/site_recovery_replication_policy, Jul. 21, 2022, 2 pages.

(Continued)

*Primary Examiner* — Michael Maskulinski
(74) *Attorney, Agent, or Firm* — Kilpatrick Townsend & Stockton LLP

(57) ABSTRACT

In response to a request to replicate resources from a primary region data center to a secondary region data center, an executable configuration file that describes the resources and their configuration is created utilizing information about the resources at the primary region data center. A correspondence table is also updated to include entries for to such resources. Utilizing the correspondence table, the executable configuration file is transformed to create a transformed executable configuration file that references the resources utilizing generic resource identifiers instead of primary region identifiers used within the primary region data center. The transformed executable configuration file is then executed at the secondary region data center to create replicated resources at the secondary region data center.

20 Claims, 10 Drawing Sheets

(56) References Cited

U.S. PATENT DOCUMENTS

| | | | |
|---|---|---|---|
| 10,999,163 B2* | 5/2021 | Abraham | ............ H04L 41/0843 |
| 2004/0158766 A1 | 8/2004 | Liccione et al. | |
| 2015/0363276 A1 | 12/2015 | Banerjee et al. | |

OTHER PUBLICATIONS

Commvault Solutions for Disaster Recovery, Available online at: https://documentation.commvault.com/commvault/11/others/pdf/CommvaultSolutionsforDisasterRecovery.pdf, Sep. 9, 2019, 23 pages.

Disaster Recovery, Available online at: https://docs.microsoft.com/en-us/azure/databricks/administration-guide/disaster-recovery, Jun. 10, 2022, 15 pages.

Disaster Recovery as a Service, Available online at: https://www.netdatavault.com/disaster-recovery-as-a-service/, 2020, 4 pages.

Disaster Recovery as a Service (DRaaS) for Cloud Providers: Cisco Reference Architecture, Available online at: https://www.cisco.com/c/dam/en/us/td/docs/solutions/hybrid_Cloud/DRaaS/2-0/Collateral/DRaaS_At-a-Glance.pdf, 2014, 2 pages.

Disaster Recovery Building Blocks, Available online at: https://cloud.google.com/architecture/dr-scenarios-building-blocks, Jun. 10, 2022, 12 pages.

Multi-Tenancy Disaster Recovery Architecture, Available online at: https://community.akumina.com/knowledge-base/multi-tenancy-disaster-recovery-architecture/, 2020, 5 pages.

Ayala, Using Terraform for Implementing Azure VM Disaster Recovery, Available online at: https://www.cloud-architect.fr/2020/10/14/using-terraform-for-implementing-azure-vm-disaster-recovery/, Oct. 14, 2020, 9 pages.

Pani, Prepare for Faster Disaster Recovery: Deploy an Amazon Aurora Global Database with Terraform (Part 1), Available online at: https://aws.amazon.com/blogs/infrastructure-and-automation/disaster-recovery-deploy-amazon-aurora-global-database-with-terraform/, Mar. 11, 2022, 9 pages.

Thiyagarajan, Single and Multi-Cloud Disaster Recovery Managementusing Terraform and Ansible, National College of Ireland, Available online at: http://norma.ncinl.ie/4144/1/rambaraththiyagarajan.pdf, Feb. 3, 2020, 22 pages.

* cited by examiner

CORRESPONDENCE TABLE
110

ENTRY 1
202A

| GENERIC RESOURCE ID 204A | PRIMARY REGION ID 212A | SECONDARY REGION ID 214A | RESOURCE TYPE 206A | DR POLICIES 208A | DR STATE 210A |

ENTRY 2
202B

| GENERIC RESOURCE ID 204B | PRIMARY REGION ID 212B | SECONDARY REGION ID 214B | RESOURCE TYPE 206B | DR POLICIES 208B | DR STATE 210B |

. . .

ENTRY N
202N

| GENERIC RESOURCE ID 204N | PRIMARY REGION ID 212N | SECONDARY REGION ID 214N | RESOURCE TYPE 206N | DR POLICIES 208N | DR STATE 210N |

*FIG. 2*

REPLICATING RESOURCES BETWEEN REGIONAL DATA CENTERS

BACKGROUND

Data centers are commonly used to server end user's workloads within various computing environments (such as cloud computing environments, multi-tenant environments, etc.). These data centers include hardware and software resources such as compute, storage, and networking resources.

Under normal circumstances, a primary region data center is used to serve end users' workloads. These workloads can include requests to retrieve data, store data, process data, etc. In the event of a disaster (such as an unforeseen failure of the primary region data center), a failover action is triggered that moves these workloads to a secondary region data center for implementation.

To minimize recovery time, this secondary region data center needs to be set ahead of time up with resources that replicate those within the primary region data center. Currently, site administrators manually create and maintain secondary region data centers, but this process is time-consuming and error prone. It is therefore desirable to improve the procedures involved in the creation and maintenance of this secondary region data center.

BRIEF SUMMARY

The present disclosure relates generally to resource replication between data centers. More particularly, novel techniques are described for creating and transforming an executable configuration file that, when executed, implements replicated resources at a data center. Various embodiments are described herein to illustrate various features. These embodiments include various methods, systems, non-transitory computer-readable storage media storing programs, code, or instructions executable by one or more processors, and the like.

According to certain implementations, in response to a request to replicate resources from a primary region data center to a secondary region data center, an executable configuration file that describes the resources and their configuration is created utilizing information about the resources at the primary region data center. A correspondence table is also updated to include entries for to such resources. Utilizing the correspondence table, the executable configuration file is transformed to create a transformed executable configuration file that references the resources utilizing generic resource identifiers instead of primary region identifiers used within the primary region data center. The transformed executable configuration file is then executed at the secondary region data center to create replicated resources at the secondary region data center.

At least one embodiment is directed to a computer-implemented method. The method can include receiving, by a computer system, a request to replicate resources from a primary region data center to a secondary region data center; obtaining, by the computer system, information about the resources at the primary region data center; creating, by the computer system, an executable configuration file utilizing the information about the resources at the primary region data center; adding, by the computer system, one or more entries to a correspondence table utilizing the information about the resources at the primary region data center; creating, by the computer system, a transformed executable configuration file utilizing the executable configuration file and the correspondence table; and executing, by the computer system, the transformed executable configuration file at the secondary region data center to implement one or more resources at the secondary region data center.

Another embodiment is directed to a system comprising one or more processors and instructions that, when executed by the one or more processors, cause the computing device to perform any suitable combination of the method(s) disclosed herein.

Still another embodiment is directed to a non-transitory computer-readable medium storing computer-executable instructions that, when executed by one or more processors of a computing cluster, cause the computing cluster to perform any suitable combination of the method(s) disclosed herein.

The foregoing, together with other features and embodiments will become more apparent upon referring to the following specification, claims, and accompanying drawings.

BRIEF DESCRIPTION OF THE DRAWINGS

To easily identify the discussion of any particular element or act, the most significant digit or digits in a reference number refer to the figure number in which that element is first introduced.

FIG. 2 illustrates details of the correspondence table of FIG. 1, according to at least one embodiment.

DETAILED DESCRIPTION

Figure 1:
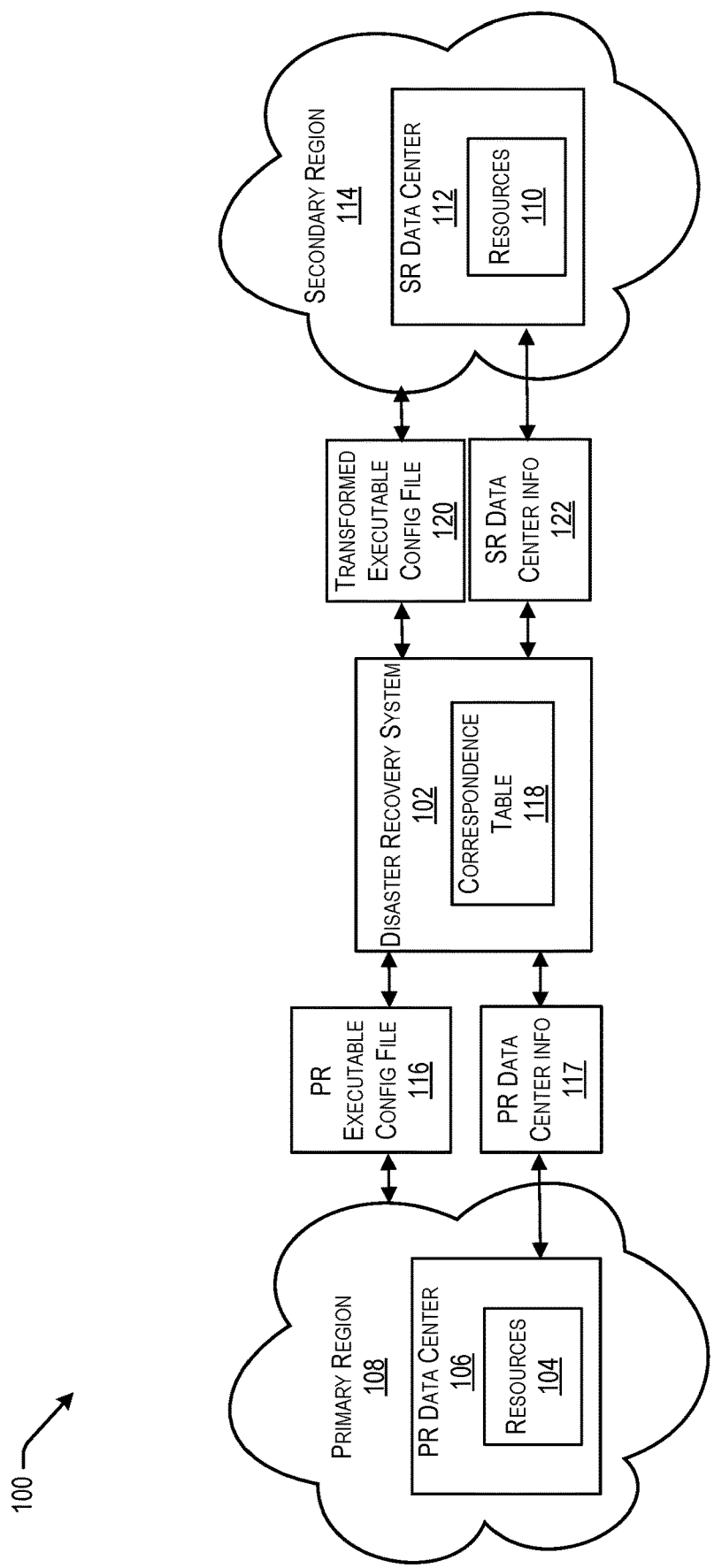
FIG. 1 is a block diagram of an exemplary resource replication environment, according to at least one embodiment.

In the following description, for the purposes of explanation, specific details are set forth in order to provide a thorough understanding of certain embodiments. However, it will be apparent that various embodiments may be practiced without these specific details. The FIGS. and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The adoption of cloud services has seen a rapid uptick in recent times. Various types of cloud services are now provided by different cloud service providers (CSPs). The term cloud service is generally used to refer to a service or functionality that is made available by a CSP to subscribing customers on demand, typically using a subscription model, using systems and infrastructure (commonly referred to as cloud infrastructure) provided by the CSP. Typically, the servers and systems included in the CSP-provided cloud infrastructure that is used to provide a cloud service to a subscribing customer are separate from the customer's own on-premise servers and systems.

The CSP-provided infrastructure can include compute, storage, and networking resources. Customers can thus avail themselves of cloud services provided by the CSP without having to purchase their own hardware and software resources for the services. Cloud services are designed to provide a subscribing customer easy, scalable, and on-demand access to applications and computing resources without the customer having to invest in procuring the infrastructure for providing the services or functions. Various types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, and the like.

When a customer or subscriber subscribes to or signs up for one or more cloud services provided by a CSP, a tenancy is created by the CSP for the customer. The tenancy is like an account that is created for the customer. Users associated with the subscribing customer can then access the services subscribed to by the customer under this tenancy.

The resources provided by a CSP for providing a set of cloud services to subscribing customers are typically organized into data centers, each data center comprising resources such as one or more computing systems or host machines, storage devices, networking hardware, etc. A data center may be configured to provide a particular set of cloud services. The CSP is responsible for equipping and configuring the data center with compute, memory, and networking and resources that are used to provide that particular set of cloud services. A CSP may provide one or more data centers depending upon the number of subscribing customers and based upon the locations of the customers.

Data centers provided by a CSP may be hosted in different geographical regions. A region may refer to a particular geographic area and may be identified by a region name. Regions are generally independent of each other and can be separated by vast distances, such as across countries or even continents. Examples of regions for a CSP may include US West, US East, Australia East, Australia Southeast, and the like. In certain implementations, a collection of regions is referred to as a realm. A realm can include one or more regions. Accordingly, a CSP may provide a realm comprising one or more regions, with each region including one or more data centers.

In certain implementations, a tenancy for a customer exists in a single realm and the customer can use the tenancy to access all regions (i.e., data centers in the regions) that belong to that realm. Users associated with the subscribing customer can then access the services subscribed to by the customer under this tenancy.

Under normal circumstances, a primary region data center is used to serve end users' workloads. These workloads can include requests to retrieve data, store data, process data, etc. In the event of a disaster (such as an unforeseen failure of one or more data centers within the primary region), a failover action is triggered that moves these workloads to a secondary region data center within the realm in which the customer tenancy exists.

To minimize recovery time, this secondary region data center needs to be set ahead of time up with infrastructure resources (such as networking, storage and compute) that mirror the infrastructure resources of the primary region data center. Additionally, site definitions that define a configuration of the resources within the primary region data center may change over time, and these updated definitions need to be replicated from the primary region data center to the secondary region data center. Currently, site administrators maintain two separate copies of the resource definitions and manually keep them in sync, but this process is cumbersome and error prone. It is desirable to improve the procedures involved in the creation and maintenance of this secondary region data center.

To address this issue, after obtaining information about the resources at a primary region data center, such information is used to create an executable configuration file (such as a Terraform file). Information about any existing resources at the secondary region data center is also obtained, and one or more entries are added to a correspondence table utilizing both the information from the primary region data center and the information from the secondary region data center. This correspondence table creates a correspondence between identifiers of resources in the primary region data center and identifiers of replicated resources in the secondary region data center. Using the correspondence table, the executable configuration file is transformed to create a transformed configuration file that is then executed at the secondary region data center to implement one or more replicated resources at the secondary region data center. The correspondence table is then updated to reflect the newly replicated resources at the secondary region data center.

FIG. 1 illustrates an exemplary resource replication environment 100, according to one exemplary embodiment. As shown, a disaster recovery system 102 is in communication with both a primary region 108 and a secondary region 114. In one embodiment, the primary region 108 and secondary region 114 may each include a predetermined portion of a cloud computing environment that is located at a predetermined geographical location. The cloud computing environment may include a group of connected computing elements implemented by a cloud service provider (CSP) that provide on-demand computing resources such as data storage, data processing capabilities, networking services, etc. The disaster recovery system 102 may be implemented all or partially within the cloud computing environment, and may include one or more hardware and/or software components.

Additionally, in one embodiment, the primary region 108 may be used to serve end users' workloads within the cloud computing environment, where the workloads can include requests to retrieve data, store data, process data, etc. Further, in one embodiment, the secondary region 114 may be used as a failover location that handles workloads in response to determining a failure of the primary region 108.

Within the primary region 108, a primary region data center 106 includes a plurality of resources 104. In one embodiment, the resources 104 within the primary region data center 106 may include one or more computing systems or host machines that are configured to provide a particular set of cloud services. For example, a cloud service provider may equip and configure the primary region data center 106 resources 104 including compute, memory, and networking resources that are used to provide a particular set of cloud services.

In response to receiving a signal (such as a request to replicate the resources 104 from the primary region data center 106 to a secondary region data center 112), the disaster recovery system 102 obtains primary region data center information 117 from the primary region data center 106. For example, the primary region data center information 117 may include one or more characteristics of the resources 104, as well as a configuration of the resources 104 within the primary region data center 106. In another example, the characteristics may include local identifiers used within the primary region data center 106 to identify the resources 104, and the configuration of the resources 104 may include existing relationships between the resources 104.

Further, the disaster recovery system creates a primary region executable configuration file 116 utilizing the primary region data center information 117. For example, the primary region executable configuration file 116 may describe the characteristics of the resources 104 within the primary region data center 106, as well as their configuration within the primary region data center 106. Also, in one embodiment, the executable configuration file may utilize identifiers for the resources 104 that are local to the primary region data center 106. The primary region executable configuration file 116 may be created using a declarative configuration language such as Terraform, etc.

Further still, the disaster recovery system 102 obtains secondary region data center information 122 from the secondary region data center 112. In one embodiment, the secondary region data center 112 may include a data center located in the secondary region 114 of a cloud computing environment. For example, the secondary region 114 of the cloud computing environment may include a region implemented during a failover action in response to a failure of the primary region 108.

Also, in one embodiment, the secondary region data center information 122 may include one or more characteristics of one or more replicated resources 110 at the secondary region data center 112, as well as a configuration of these replicated resources 110 at the secondary region data center 112. The secondary region data center information 122 may also include a correspondence between the replicated resources 110 at the secondary region data center 112 and the resources 104 at the primary region data center 106. This correspondence may be provided by a user or may be determined by comparing characteristics of each of the resources.

In one embodiment, if no replicated resources 110 currently exist within the secondary region data center 112, the secondary region data center information 122 may indicate that no resources currently exist.

In addition, the disaster recovery system 102 adds one or more entries to a correspondence table 118 utilizing the primary region data center information 117 and the secondary region data center information 122. In one embodiment, the correspondence table 118 may be created by the disaster recovery system 102 before adding the entries. In another embodiment, the correspondence table 118 may include a symbol table, and each entry may include a symbol.

In one embodiment, an entry may be created within the correspondence table 118 for each resource 104 within the primary region data center 106 that is to be replicated. Additional details of the correspondence table 118 are found in FIG. 2, and additional details about how the correspondence table is populated are found in FIG. 3.

Further, the disaster recovery system 102 creates a transformed executable configuration file 120 utilizing the primary region executable configuration file 116 and the correspondence table 118. For example, the transformed executable configuration file 120 may be created by transforming the primary region executable configuration file 116 utilizing the entries within the correspondence table 118. Additional details about how the transformed executable configuration file 120 is created are found in FIG. 3.

Further still, the disaster recovery system 102 executed the transformed executable configuration file 120 at the secondary region data center 112 to implement one or more replicated resources 110. Additional details about the execution of the transformed executable configuration file 120 are found in FIG. 3. After executing the transformed executable configuration file 120, the resources 104 in the primary region data center 106, as well as characteristics of those resources 104 and a configuration of those resources 104, are replicated as replicated resources 110 within the secondary region data center 112.

Also, in one embodiment, after executing the transformed executable configuration file 120 at the secondary region data center 112, the disaster recovery system may obtain updated information about the resources 110 at the secondary region data center 112, and may update one or more entries within the correspondence table 118, utilizing the updated information.

Additionally, in response to an identification of a failure of the primary region data center 106, one or more workloads may be redirected from the primary region data center 106 to the secondary region data center 112, requests directed to the primary region data center 106 may be redirected to the secondary region data center 112 for implementation, etc.

In this way, the correspondence table 118 may be used to create and maintain a correspondence between resources 104 within the primary region data center 106 and resources 110 within the secondary region data center 112.

FIG. 2 illustrates details 200 of the correspondence table 118 of FIG. 1, according to one embodiment. As shown, the correspondence table 118 includes a plurality of entries 202A-N, each containing corresponding values 204A-N, 206A-N, 208A-N, 210A-N, 212A-N, and 214A-N. In one example, each of the plurality of entries 202A-N may be created to represent one of the first plurality of resources 104 within a primary region data center 106 of FIG. 1.

For instance, a first entry 202A may be created within the correspondence table 118 to represent a first resource within the primary region data center 106 of the resource replication environment 100 of FIG. 1. A generic resource identifier 204A may be created for the first entry 202A (e.g., utilizing a namespace of the correspondence table 118). For example, the generic resource identifier 204A may include a unifying identifier that is determined arbitrarily, according to one or more predetermined criteria associated with the correspondence table 118, etc.

Additionally, the first entry 202A is also assigned a resource type 206A indicative of a type of the first resource. Disaster recovery policies 208A associated with the first resource and a current disaster recovery state 210A of the first resource are also determined and added to the first entry 202A.

Further, a primary region identifier 212A is determined for the first resource and is added to the first entry 202A. This primary region identifier 212A is a local identifier used to identify the first resource within the primary region data center 106 of FIG. 1, where the primary region identifier 212A was created using a local namespace of the primary region data center 106. For example, the primary region identifier 212A is used to identify the first resource within the primary region data center 106 of the primary region 108 of FIG. 1.

Further still, a secondary region identifier 214A is also added to the first entry 202A. This secondary region identifier 214A is the local identifier for a replicated resource that was created within the secondary region data center 112 of the secondary region 114 of FIG. 1. For example, the replicated resource may be created as a replication of the first resource within the primary region data center 106 of the primary region 108 of FIG. 1. The secondary region identifier 214A of this second resource may be created using a local namespace of the secondary region data center 112. For example, the secondary region identifier 214A is used to identify the second resource within the secondary region data center 112 of FIG. 1.

In one embodiment, in response to determining additional regions containing additional copies of resources replicated from the primary region data center 106, local identifiers for these replicated resources may be determined and may be added to the corresponding entries within the correspondence table 118. Also, in one embodiment, the correspondence table 118 may include entries for multiple different primary and secondary data centers across a variety of different regions.

In this way, each of the plurality of entries 202A-N within the correspondence table 118 contains information used to identify/reference a resource within the primary region data center 106 of FIG. 1, as well as information used to identify/reference a replication of such resource within the secondary region data center 112 of FIG. 1. This correspondence table 118 may then be used to propagate changes made within the primary region data center 106 to the secondary region data center 112.

Figure 3:
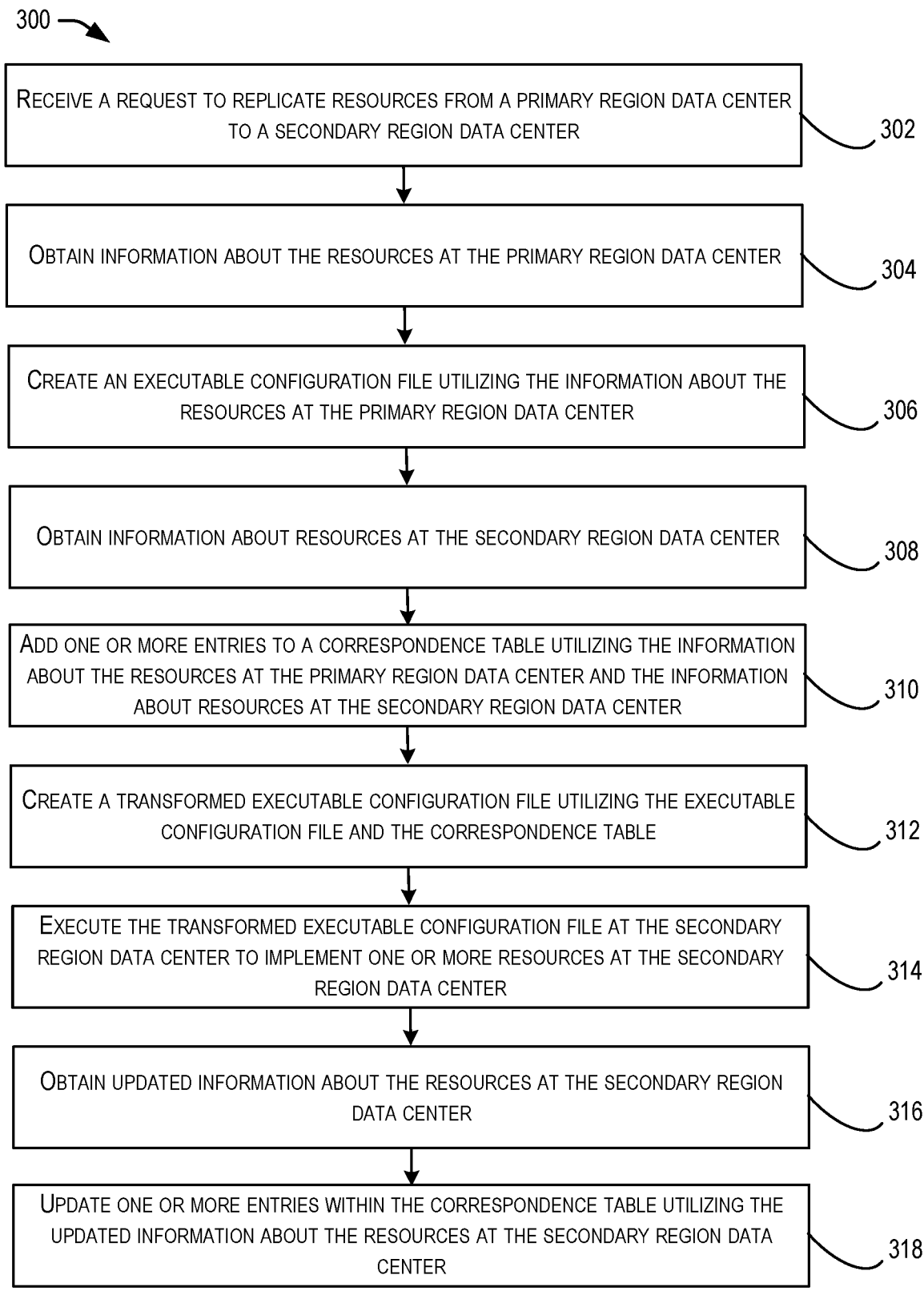
FIG. 3 illustrates an example method for replicating resources between regional data centers, according to at least one embodiment.

FIG. 3 illustrates an example method 300 for replicating resources between regional data centers, according to at least one embodiment. The method 300 may be performed by one or more components of FIGS. 1-2. A computer-readable storage medium comprising computer-readable instructions that, upon execution by one or more processors of a computing device, cause the computing device to perform the method 300. The method 300 may performed in any suitable order. It should be appreciated that the method 300 may include a greater number or a lesser number of steps than that depicted in FIG. 3.

The method 300 may begin at 302, where a request is received to replicate resources from a primary region data center to a secondary region data center. In one embodiment, the request may be received via an application programming interface (API), via a graphical user interface (GUI), etc. Also, in one embodiment, the request may be received by a customer tenancy implemented utilizing a cloud service provider (CSP). Further, in one embodiment, the request may be received at a predetermined time, according to a predetermined schedule, etc. For example, the predetermined schedule may be configured by one or more users.

Additionally, in one embodiment, the primary region data center may include a data center located in the primary region of a cloud computing environment. For example, the cloud computing environment may include a group of connected computing elements that provide on-demand computing resources such as data storage, data processing capabilities, networking services, etc. In another example, the primary region of the cloud computing environment may include a portion of the computing elements of the cloud computing environment that are located at a predetermined geographical location.

In another example, a region may refer to a particular geographic area and may be identified by a region name. Regions are generally independent of each other and can be separated by vast distances, such as across countries or even continents. Examples of regions for a CSP may include US West, US East, Australia East, Australia Southeast, and the like. In certain implementations, a collection of regions is referred to as a realm. A realm can include one or more regions. Accordingly, a CSP may provide a realm comprising one or more regions, with each region including one or more data centers.

Further, in one example, a primary region may be used to serve end users' workloads. These workloads can include requests to retrieve data, store data, process data, etc. In the event of a disaster (such as an unforeseen failure of one or more data centers within the primary region), a failover action is triggered that moves these workloads to a secondary region (and therefore to corresponding data centers of the secondary region) within the realm in which the customer tenancy exists.

Further still, in one embodiment, the primary region data center may include one or more computing systems or host machines that are configured to provide a particular set of cloud services. For example, the CSP may equip and configure the data center with compute, memory, and networking resources that are used to provide that particular set of cloud services.

Also, in one embodiment, the resources within the primary region data center may include compute resources (such as predetermined amounts of processing capability), networking resources (such as predetermined data routing capabilities), storage resources (such as predetermined amounts of data storage), virtual resources (such as user passwords, groups, policies, keys, etc.), regionally available services, etc. These resources may be assigned to one or more compartments (e.g., collections of related resources) within the primary region. In one embodiment, the resources requested to be replicated may include a subset of all resources within the primary region data center.

Additionally, at 304, information about the resources at the primary region data center is obtained. In one embodiment, the information about the resources may include one or more characteristics of the resources, as well as a configuration of the resources. For example, the characteristics may include local identifiers used within the primary region data center to identify the resources.

In another example, the configuration of the resources may include existing relationships between the resources. For example, the relationships may identify any settings implemented for the resources, dependencies between the resources, any existing resource hierarchies, etc. In yet another example, the configuration of the resources may be identified as stack information for the primary region data center.

Also, in one embodiment, the information about the resources may be determined by identifying and analyzing one or more aspects of the primary region data center during one or more discovery operations. For example, the configuration of the resources may include metadata that is extracted from the primary region data center, where the metadata identifies one or more aspects of the resources. In another example, one or more metadata repositories within the primary region data center may be identified and parsed to extract and save the metadata.

Further, at 306, an executable configuration file is created utilizing the information about the resources at the primary region data center. In one embodiment, the executable configuration file may describe the characteristics of the resources within the primary region data center, as well as their configuration within the primary region data center. Also, in one embodiment, the executable configuration file may be created using a declarative configuration language such as Terraform, etc. In one embodiment, the executable configuration file may utilize identifiers for each resource that are local to the primary region data center.

Also, in one embodiment, the executable configuration file may include only a difference (e.g., a delta) between a current configuration of resources within the primary region data center and an earlier configuration of resources within the primary region data center. For example, resources within the primary region data center, as well as the configuration of such resources, may be periodically replicated to the secondary region data center (e.g., according to a predetermined schedule or other initiating criteria). Differences may be determined between (1) resources and their configuration within a current state of the primary region data center and (2) resources and their configuration within an historical state of the primary region data center during a previous replication, and only these differences may be included within the executable configuration file.

Further still, as shown in operation 308, information is obtained about resources at the secondary region data center. In one embodiment, the secondary region data center may include a data center located in the secondary region of a cloud computing environment. For example, the secondary region of the cloud computing environment may include a region implemented during a failover action in response to a failure of the primary region of the cloud computing environment.

Also, in one embodiment, the information about resources at the secondary region data center may be determined by identifying and analyzing one or more aspects of the secondary region data center during one or more discovery operations. For example, the configuration of the resources may include metadata that is extracted from the secondary region data center, where the metadata identifies one or more aspects of the resources. In another example, one or more metadata repositories within the secondary region data center may be identified and parsed to extract and save the metadata.

In addition, in one embodiment, the information may include one or more characteristics of one or more resources at the secondary region data center, as well as a configuration of these resources at the secondary region data center. Also, in one embodiment, the information may include an indication that no resources are currently implemented within the secondary region data center.

Furthermore, in one embodiment, resources at the secondary region data center may correspond to resources at the primary region data center. For example, in response to the failure of the primary region data center, the resources at the secondary region data center may be used in a failover capacity to process workloads originally intended for resources at the primary region data center. Further still, in one embodiment, the resources at the secondary region data center may correspond to a subset of resources at the primary region data center. Also, in one embodiment, the correspondence between specific resources at the primary region data center and specific resources at the secondary region data center may be predetermined, provided by a user, etc.

Also, at 310, one or more entries are added to a correspondence table utilizing the information about the resources at the primary region data center and the information about resources at the secondary region data center. In one embodiment, the correspondence table itself may be created before adding the entries. In one example, the correspondence table may include a symbol table.

Additionally, in one embodiment, an entry may be created within the correspondence table for each resource within the primary region data center that is to be replicated. Each entry may include a local identifier used within the primary region data center to identify the resource (e.g., a primary region identifier for the resource). Each entry may also include additional information about the resource, including a type of the resources, a disaster recovery state of the resource, one or more disaster recovery policies associated with the resource, etc.

Further, in one embodiment, for each resource within the primary region data center, the entry added to the correspondence table may include information identifying a corresponding replicated resource (if available) within the secondary region data center. For example, the information identifying the corresponding replicated resource may include a local identifier used within the secondary region data center to identify the corresponding replicated resource (e.g., a secondary region identifier for the corresponding replicated resource).

Further still, in one embodiment, for each resource within the primary region data center, the entry added to the correspondence table may include a generic resource identifier created for the resource within the correspondence table. For example, the correspondence table may include a symbol table, and each entry within the symbol table may include a symbol representing the corresponding resource, where the symbol is created using a namespace of the correspondence table.

In addition, at 312, a transformed executable configuration file is created utilizing the executable configuration file and the correspondence table. In one embodiment, the transformed executable configuration file may be created by transforming the executable configuration file utilizing the entries within the correspondence table. For example, the executable configuration file may describe the characteristics of the resources within the primary region data center, as well as their configuration within the primary region data center. The executable configuration file may also utilize identifiers for these resources that are local to the primary region data center (primary region identifiers).

In one example, transforming the executable configuration file may include identifying each primary region identifier within the executable configuration file. For each primary region identifier that is identified within the executable configuration file, an entry within the correspondence table may be determined that contains the primary region identifier. It may then be determined whether a secondary region identifier is also stored within the entry.

In response to determining that a secondary region identifier is also stored within the entry, the secondary region identifier for the entry may be substituted for the primary region identifier within the transformed executable configuration file. In response to determining that a secondary region identifier is not stored within the entry, the generic resource identifier may be substituted for the primary region identifier within the transformed executable configuration file. Also, in one embodiment, the transformed executable configuration file may be created using a declarative configuration language such as Terraform, etc.

In this way, an executable configuration file that utilizes primary region identifiers for resources within the primary region data center may be transformed to create a transformed executable configuration file that references secondary region identifiers (if available) for corresponding resources within the secondary region data center and/or generic resource identifiers for those resources within the correspondence table, instead of primary region identifiers that reference the resources at the primary region data center.

Furthermore, at 314, the transformed executable configuration file is executed at the secondary region data center to implement one or more resources at the secondary region data center. In one embodiment, the transformed executable configuration file may include characteristics and/or a configuration for each resource identifier included within the transformed executable configuration file.

In response to determining that a resource identifier within the transformed executable configuration file is a secondary region identifier, a resource that corresponds to the secondary region identifier may be determined within the secondary region data center, and characteristics and/or a configuration indicated within the transformed executable configuration file may be applied to the resource within the secondary region data center.

In response to determining that the resource identifier is a generic resource identifier, a new resource may be created within the secondary region data center that corresponds to the generic resource identifier. Characteristics and/or a configuration indicated within the transformed executable configuration file may also be applied to the newly created resource within the secondary region data center. A secondary region identifier may also be created and assigned to the newly created resource. This secondary region identifier may include a local identifier used within the secondary region data center to identify the newly created resource. The secondary region identifier may be randomly generated and assigned during the creation of the resource, or a predetermined identifier (e.g., an identifier provided by a user) may be used.

In this way, resources in the primary region data center may be replicated to the secondary region data center, as well as characteristics of those resources and a configuration of those resources.

Further still, at 316, updated information is obtained about the resources at the secondary region data center. For example, within the secondary region data center, secondary region identifiers may be determined for all newly created resources resulting from the execution of the transformed executable configuration file. Generic resource identifiers corresponding to these secondary region identifiers may also be determined.

Also, at 318, one or more entries within the correspondence table are updated utilizing the updated information about the resources at the secondary region data center. In one embodiment, secondary region identifiers determined for all newly created resources within the secondary region data center may be added to corresponding entries within the correspondence table. For example, for each newly created resource within the secondary region data center, the generic resource identifier for the resource may be used to identify a corresponding entry for that resource within the correspondence table. The secondary region identifier for that resource may then be added to the identified entry in the correspondence table.

Further still, in one embodiment, only a first portion of the resources within the transformed executable configuration file may be created within the secondary region data center prior to a failure of the primary region data center. For example, in response to a failure of the primary region data center, the remaining resources may be created within the secondary region data center. This first portion may be indicated within one or more predetermined policies, where the policies may consider disaster recovery rate as well as associated cost. For instance, implementing a larger number of resources within a secondary region data center prior to the failure of the primary region data center may improve a disaster recovery rate but may require more resource usage. The one or more policies may be stored within the correspondence table in association with the corresponding resources.

Also, in one embodiment, a failure of the primary region data center may be identified, and one or more disaster recovery operations may be performed utilizing the secondary region data center. For example, in response to an identification of a failure of the primary region data center, one or more workloads may be redirected from the primary region data center to the secondary region data center, requests directed to the primary region data center may be redirected to the secondary region data center for implementation, etc.

In this way, a correspondence table may be used to maintain a correspondence between resources within a primary region data center and resources within a secondary region data center. This correspondence may simplify and automate resource replication as well as the propagation of changes to resources within the primary region data center to corresponding replicated resources within the secondary region data center. By maintaining a secondary region data center that accurately replicates a primary region data center, failover operations may be implemented quickly and effectively in response to the failure of the primary region data center. A performance of applications relying on resources within a failed region may also be maximized by providing replicated resources quickly and efficiently.

Figure 4:
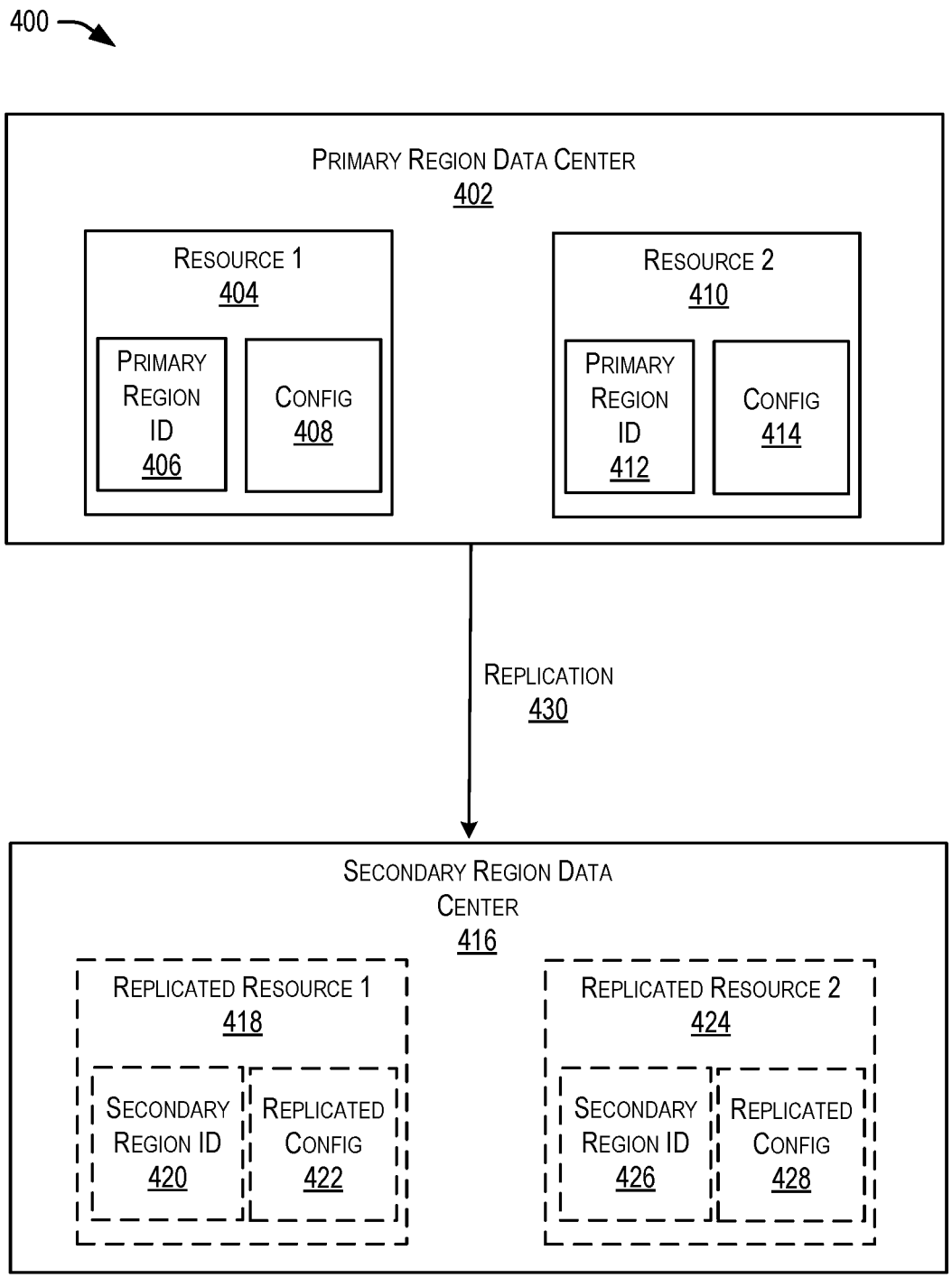
FIG. 4 illustrates an exemplary replication of a primary region data center to an empty secondary region data center, according to at least one embodiment.

FIG. 4 illustrates an exemplary replication 400 of a primary region data center 402 to an empty secondary region data center 416, according to one exemplary embodiment. In one embodiment, the primary region data center 402 may correspond to the primary region data center 106 of FIG. 1. As shown, the primary region data center 402 includes a first resource 404 that is referenced within the primary region data center 402 utilizing a primary region identifier 406. The first resource 404 also includes a configuration 408 that may indicate one or more settings, dependencies, hierarchies, etc. for the first resource 404 within the primary region data center 402.

Likewise, the primary region data center 402 includes a second resource 410 that is referenced within the primary region data center 402 utilizing a primary region identifier 412. The second resource 410 also includes a configuration 414 that may indicate one or more settings, dependencies, hierarchies, etc. for the second resource 410 within the primary region data center 402.

Prior to replication 430 being performed, the secondary region data center 416 is empty. For example, prior to replication 430, the secondary region data center 416 contains no replicated resources corresponding to the first resource 404 and the second resource 410 at the primary region data center 402. In one embodiment, the secondary region data center 416 may correspond to the secondary region data center 112 of FIG. 1.

However, after replication 430 is performed (e.g., by executing a transformed executable configuration file at the secondary region data center 416 in a manner described in FIG. 3), a first replicated resource 418 is implemented within the secondary region data center 416, where the first replicated resource 418 is a replication of the first resource 404 of the primary region data center 402. Also, the first replicated resource 418 is referenced within the secondary region data center 416 utilizing a secondary region identifier 420 that is different from the primary region identifier 406 of the first resource 404. The first replicated resource 418 also includes a replicated configuration 422 that replicates the configuration 408 of the first resource 404 within the primary region data center 402.

Also, after replication 430 is performed, a second replicated resource 424 is implemented within the secondary region data center 416, where the second replicated resource 424 is a replication of the second resource 410 of the primary region data center 402. Also, the second replicated resource 424 is referenced within the secondary region data center 416 utilizing a secondary region identifier 426 that is different from the primary region identifier 412 for the second resource 410. The second replicated resource 424 also includes a replicated configuration 428 that replicates the configuration 414 of the second resource 410 within the primary region data center 402.

Figure 5:
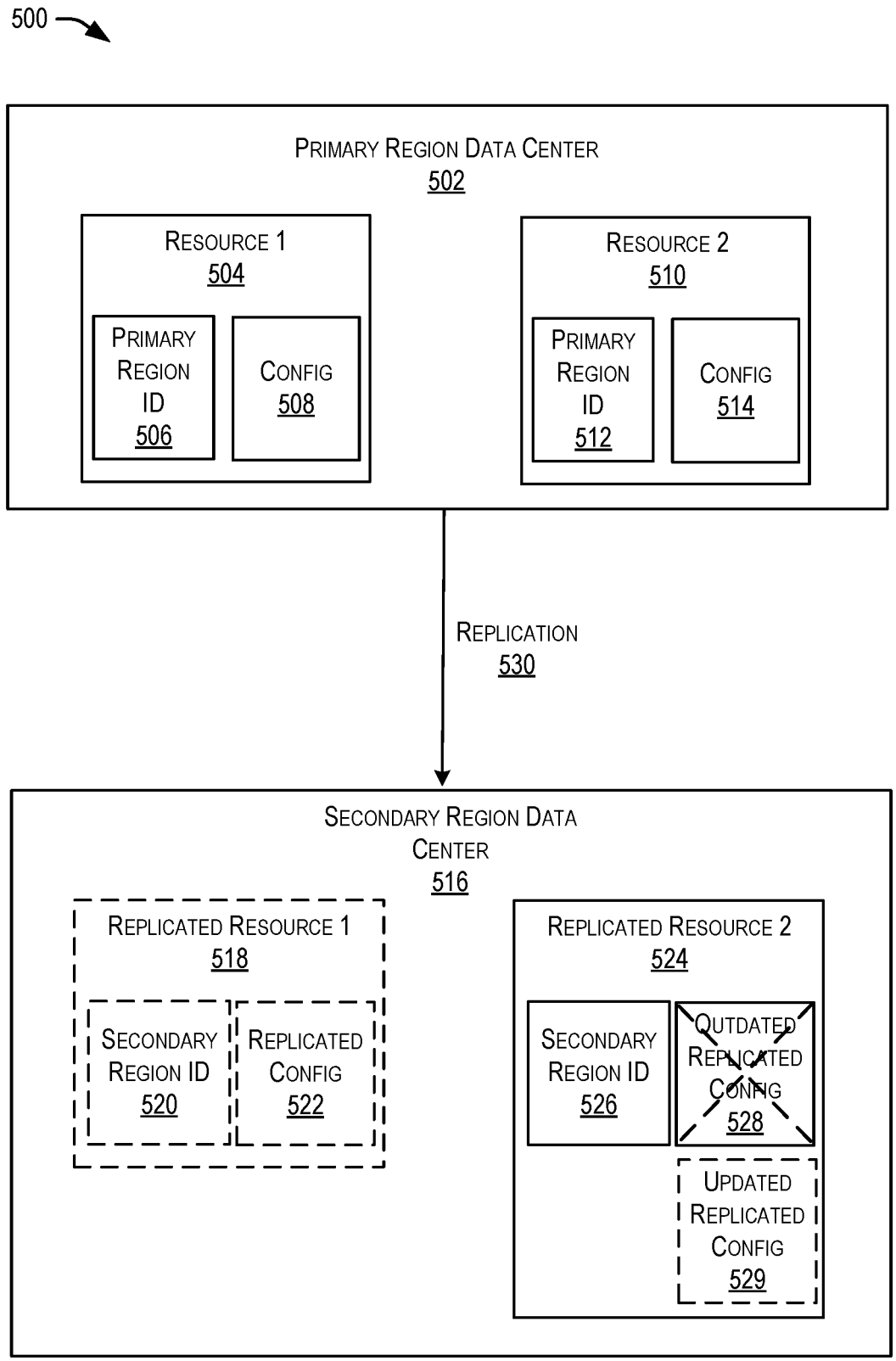
FIG. 5 illustrates an exemplary replication of a primary region data center to a partially complete secondary region data center, according to at least one embodiment.

FIG. 5 illustrates an exemplary replication 500 of a primary region data center 502 to a partially complete secondary region data center 516, according to one exemplary embodiment. In one embodiment, the primary region data center 502 may correspond to the primary region data center 106 of FIG. 1. As shown, the primary region data center 502 includes a first resource 504 that is referenced within the primary region data center 502 utilizing a primary region identifier 506. The first resource 504 also includes a configuration 508 that may indicate one or more settings, dependencies, hierarchies, etc. for the first resource 504 within the primary region data center 502.

Likewise, the primary region data center 502 includes a second resource 510 that is referenced within the primary region data center 502 utilizing a primary region identifier 512. The second resource 510 also includes a configuration 514 that may indicate one or more settings, dependencies, hierarchies, etc. for the second resource 510 within the primary region data center 502.

Prior to replication 430 being performed, the secondary region data center 416 contains a second replicated resource 524, where the second replicated resource 524 is a replication of the second resource 510 of the primary region data center 502. The second replicated resource 524 is referenced within the secondary region data center 516 utilizing a secondary region identifier 526 that is different from the primary region identifier 512 for the second resource 510. The second replicated resource 524 also includes a manually created, outdated replicated configuration 528 that replicates an outdated configuration of the second resource 510 within the primary region data center 502. In one embodiment, the secondary region data center 516 may correspond to the secondary region data center 112 of FIG. 1.

After replication 530 is performed (e.g., by executing a transformed executable configuration file at the secondary region data center 516 in a manner described in FIG. 3), a first replicated resource 518 is implemented within the secondary region data center 516, where the first replicated resource 518 is a replication of the first resource 504 of the primary region data center 502. Also, the first replicated resource 518 is referenced within the secondary region data center 516 utilizing a secondary region identifier 520 that is different from the primary region identifier 506 of the first resource 504. The first replicated resource 518 also includes a replicated configuration 522 that replicates the configuration 508 of the first resource 504 within the primary region data center 502.

Also, after replication 530 is performed, the second replicated resource 524 is updated within the secondary region data center 516. More specifically, the secondary region identifier 426 for the second replicated resource 524 is maintained, but the outdated replicated configuration 528 is replaced with an updated replicated configuration 529 that accurately replicates the configuration 514 of the second resource 510 within the primary region data center 502.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
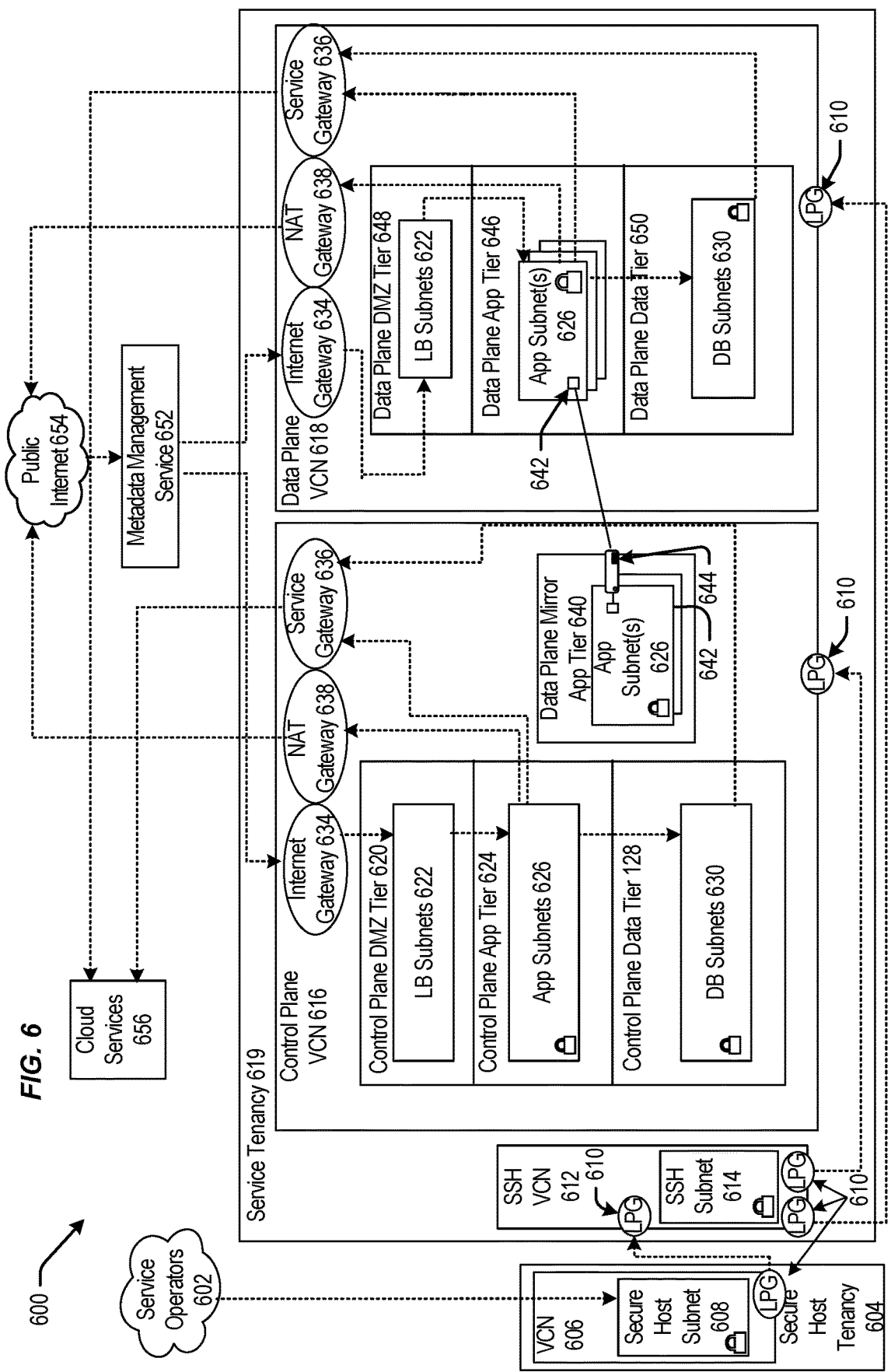
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Metadata that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
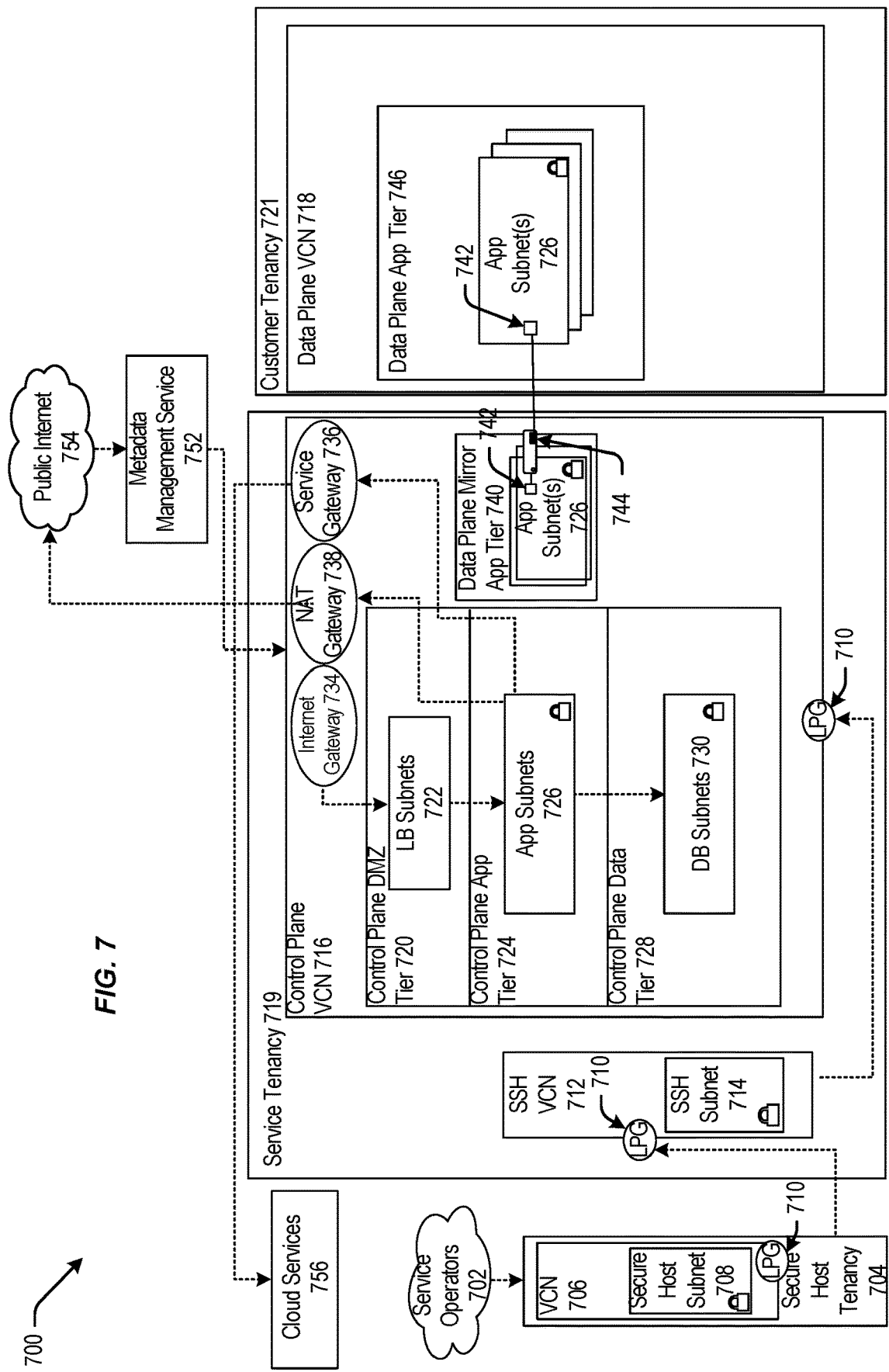
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 602 of FIG. 6) can be communicatively coupled to a secure host tenancy 704 (e.g., the secure host tenancy 604 of FIG. 6) that can include a virtual cloud network (VCN) 706 (e.g., the VCN 606 of FIG. 6) and a secure host subnet 708 (e.g., the secure host subnet 608 of FIG. 6). The VCN 706 can include a local peering gateway (LPG) 710 (e.g., the LPG 610 of FIG. 6) that can be communicatively coupled to a secure shell (SSH) VCN 712 (e.g., the SSH VCN 612 of FIG. 6) via an LPG 610 contained in the SSH VCN 712. The SSH VCN 712 can include an SSH subnet 714 (e.g., the SSH subnet 614 of FIG. 6), and the SSH VCN 712 can be communicatively coupled to a control plane VCN 716 (e.g., the control plane VCN 616 of FIG. 6) via an LPG 710 contained in the control plane VCN 716. The control plane VCN 716 can be contained in a service tenancy 719 (e.g., the service tenancy 619 of FIG. 6), and the data plane VCN 718 (e.g., the data plane VCN 618 of FIG. 6) can be contained in a customer tenancy 721 that may be owned or operated by users, or customers, of the system.

The control plane VCN 716 can include a control plane DMZ tier 720 (e.g., the control plane DMZ tier 620 of FIG. 6) that can include LB subnet(s) 722 (e.g., LB subnet(s) 622 of FIG. 6), a control plane app tier 724 (e.g., the control plane app tier 624 of FIG. 6) that can include app subnet(s) 726 (e.g., app subnet(s) 626 of FIG. 6), a control plane data tier 728 (e.g., the control plane data tier 628 of FIG. 6) that can include database (DB) subnet(s) 730 (e.g., similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g., the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g., the service gateway 636 of FIG. 6) and a network address translation (NAT) gateway 738 (e.g., the NAT gateway 638 of FIG. 6). The control plane VCN 716 can include the service gateway 736 and the NAT gateway 738.

The control plane VCN 716 can include a data plane mirror app tier 740 (e.g., the data plane mirror app tier 640 of FIG. 6) that can include app subnet(s) 726. The app subnet(s) 726 contained in the data plane mirror app tier 740 can include a virtual network interface controller (VNIC) 742 (e.g., the VNIC of 642) that can execute a compute instance 744 (e.g., similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g., the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g., the metadata management service 652 of FIG. 6) that can be communicatively coupled to public Internet 754 (e.g., public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g., cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
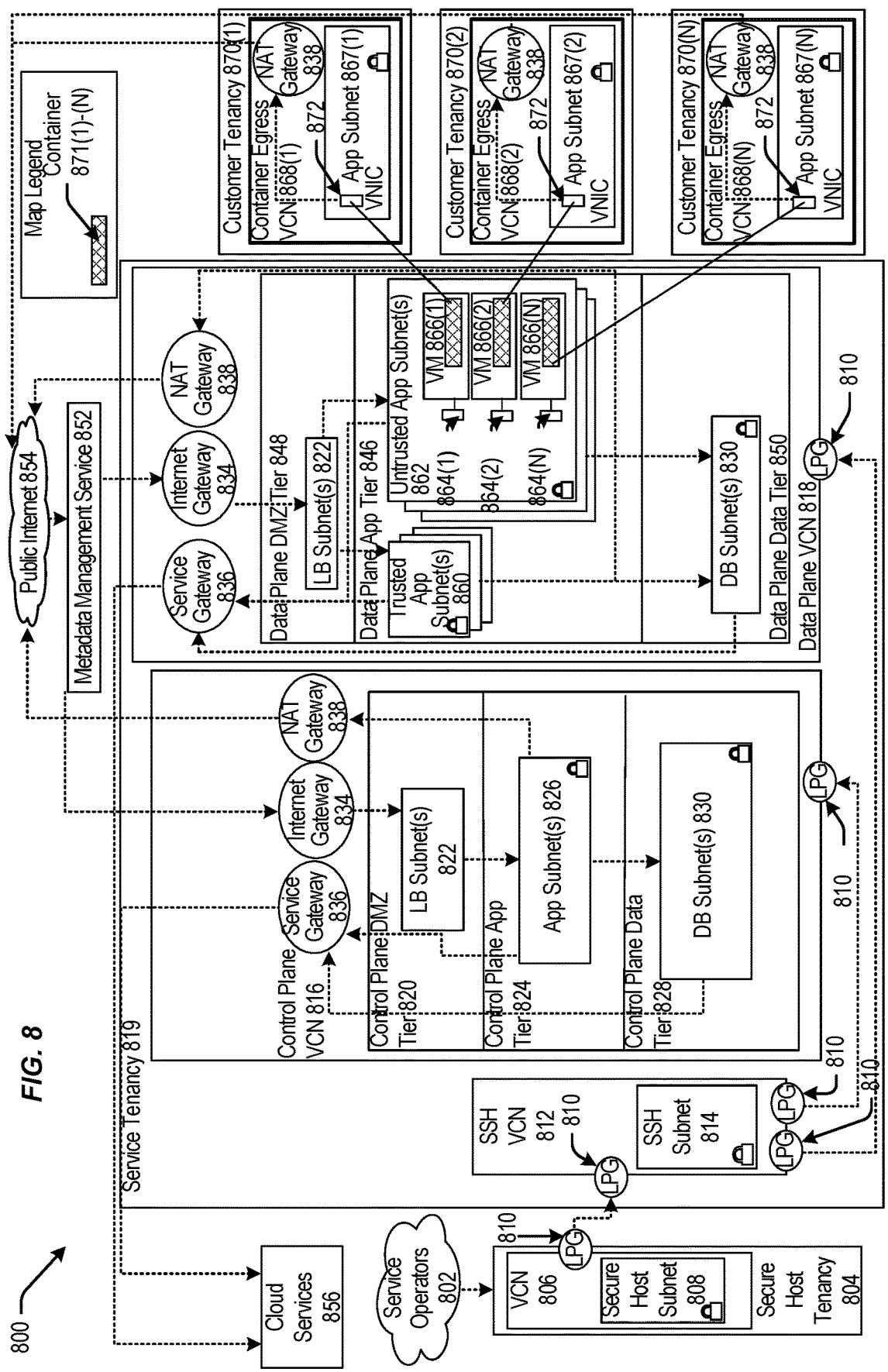
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 602 of FIG. 6) can be communicatively coupled to a secure host tenancy 804 (e.g., the secure host tenancy 604 of FIG. 6) that can include a virtual cloud network (VCN) 806 (e.g., the VCN 606 of FIG. 6) and a secure host subnet 808 (e.g., the secure host subnet 608 of FIG. 6). The VCN 806 can include an LPG 810 (e.g., the LPG 610 of FIG. 6) that can be communicatively coupled to an SSH VCN 812 (e.g., the SSH VCN 612 of FIG. 6) via an LPG 810 contained in the SSH VCN 812. The SSH VCN 812 can include an SSH subnet 814 (e.g., the SSH subnet 614 of FIG. 6), and the SSH VCN 812 can be communicatively coupled to a control plane VCN 816 (e.g., the control plane VCN 616 of FIG. 6) via an LPG 810 contained in the control plane VCN 816 and to a data plane VCN 818 (e.g., the data plane 618 of FIG. 6) via an LPG 810 contained in the data plane VCN 818. The control plane VCN 816 and the data plane VCN 818 can be contained in a service tenancy 819 (e.g., the service tenancy 619 of FIG. 6).

The control plane VCN 816 can include a control plane DMZ tier 820 (e.g., the control plane DMZ tier 620 of FIG. 6) that can include load balancer (LB) subnet(s) 822 (e.g., LB subnet(s) 622 of FIG. 6), a control plane app tier 824 (e.g., the control plane app tier 624 of FIG. 6) that can include app subnet(s) 826 (e.g., similar to app subnet(s) 626 of FIG. 6), a control plane data tier 828 (e.g., the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g., the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 6) and a network address translation (NAT) gateway 838 (e.g., the NAT gateway 638 of FIG. 6). The control plane VCN 816 can include the service gateway 836 and the NAT gateway 838.

The data plane VCN 818 can include a data plane app tier 846 (e.g., the data plane app tier 646 of FIG. 6), a data plane DMZ tier 848 (e.g., the data plane DMZ tier 648 of FIG. 6), and a data plane data tier 850 (e.g., the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g., public Internet 654 of FIG. 6).

The Internet gateway 834 contained in the control plane VCN 816 and contained in the data plane VCN 818 can be communicatively coupled to a metadata management service 852 (e.g., the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
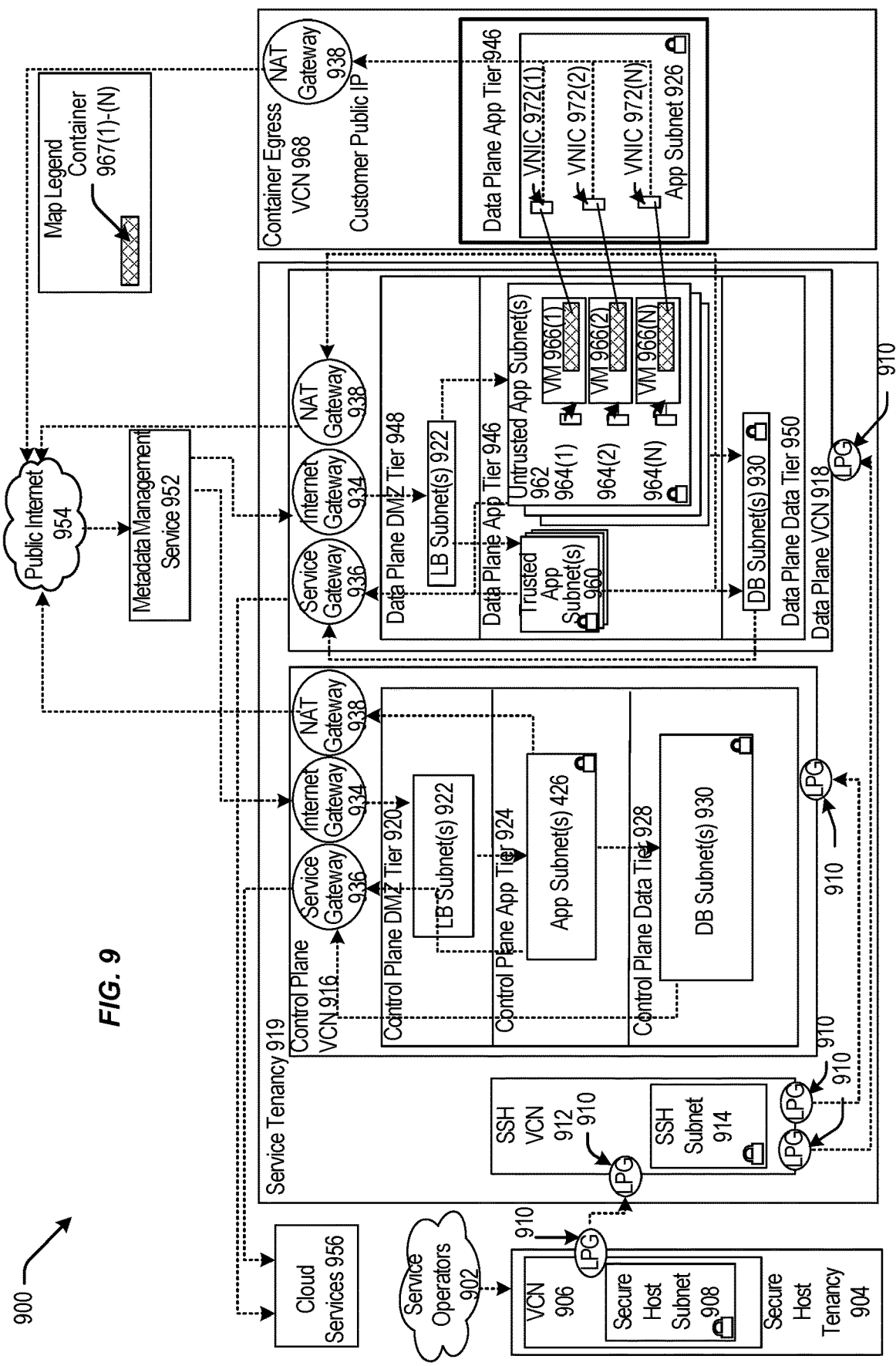
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 602 of FIG. 6) can be communicatively coupled to a secure host tenancy 904 (e.g., the secure host tenancy 604 of FIG. 6) that can include a virtual cloud network (VCN) 906 (e.g., the VCN 606 of FIG. 6) and a secure host subnet 908 (e.g., the secure host subnet 608 of FIG. 6). The VCN 906 can include an LPG 910 (e.g., the LPG 610 of FIG. 6) that can be communicatively coupled to an SSH VCN 912 (e.g., the SSH VCN 612 of FIG. 6) via an LPG 910 contained in the SSH VCN 912. The SSH VCN 912 can include an SSH subnet 914 (e.g., the SSH subnet 614 of FIG. 6), and the SSH VCN 912 can be communicatively coupled to a control plane VCN 916 (e.g., the control plane VCN 616 of FIG. 6) via an LPG 910 contained in the control plane VCN 916 and to a data plane VCN 918 (e.g., the data plane 618 of FIG. 6) via an LPG 910 contained in the data plane VCN 918. The control plane VCN 916 and the data plane VCN 918 can be contained in a service tenancy 919 (e.g., the service tenancy 619 of FIG. 6).

The control plane VCN 916 can include a control plane DMZ tier 920 (e.g., the control plane DMZ tier 620 of FIG. 6) that can include LB subnet(s) 922 (e.g., LB subnet(s) 622 of FIG. 6), a control plane app tier 924 (e.g., the control plane app tier 624 of FIG. 6) that can include app subnet(s) 926 (e.g., app subnet(s) 626 of FIG. 6), a control plane data tier 928 (e.g., the control plane data tier 628 of FIG. 6) that can include DB subnet(s) 930 (e.g., DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g., the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 6) and a network address translation (NAT) gateway 938 (e.g., the NAT gateway 638 of FIG. 6). The control plane VCN 916 can include the service gateway 936 and the NAT gateway 938.

The data plane VCN 918 can include a data plane app tier 946 (e.g., the data plane app tier 646 of FIG. 6), a data plane DMZ tier 948 (e.g., the data plane DMZ tier 648 of FIG. 6), and a data plane data tier 950 (e.g., the data plane data tier 650 of FIG. 6). The data plane DMZ tier 948 can include LB subnet(s) 922 that can be communicatively coupled to trusted app subnet(s) 960 (e.g., trusted app subnet(s) 860 of FIG. 8) and untrusted app subnet(s) 962 (e.g., untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g., public Internet 654 of FIG. 6).

The Internet gateway 934 contained in the control plane VCN 916 and contained in the data plane VCN 918 can be communicatively coupled to a metadata management service 952 (e.g., the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
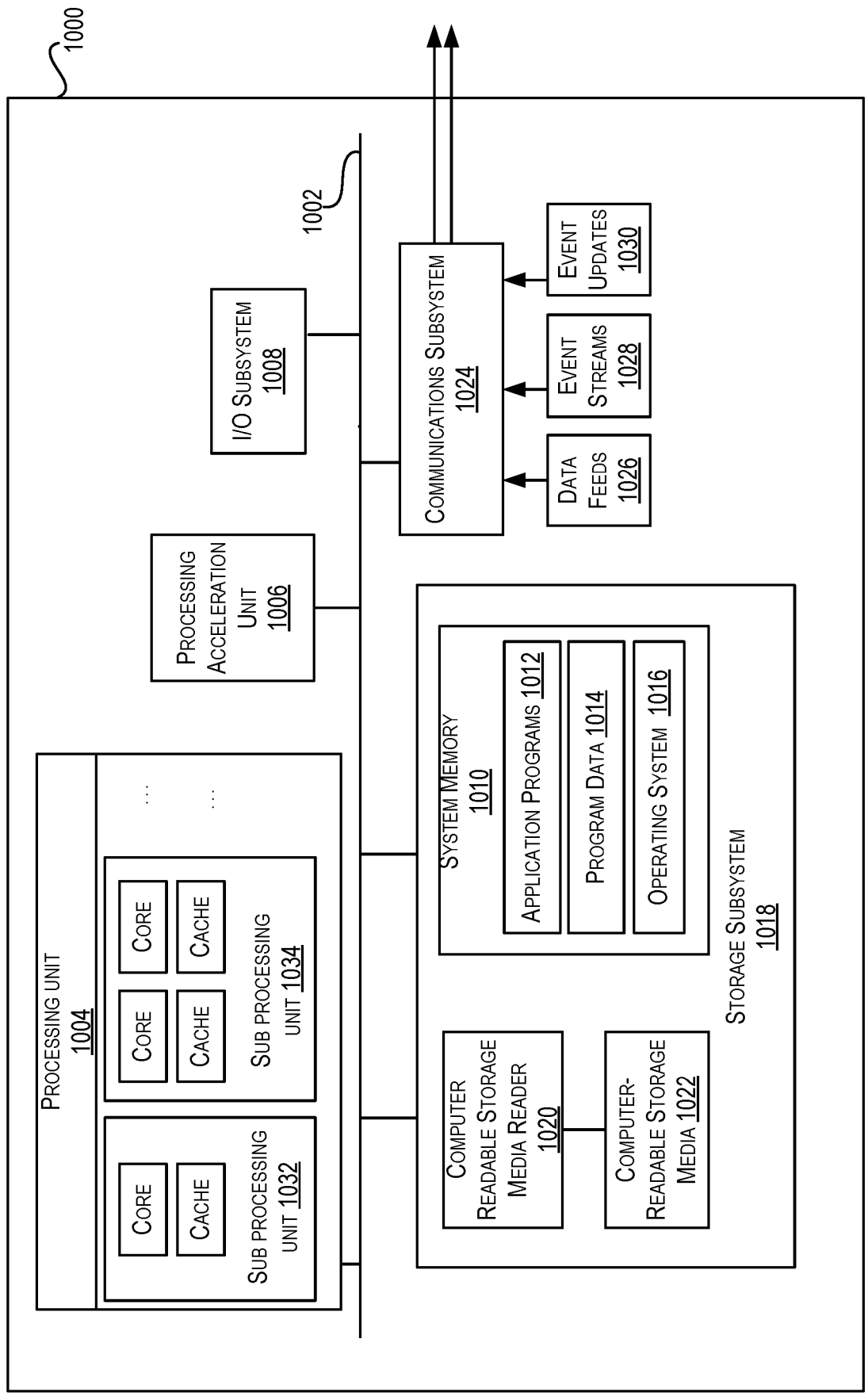
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, web cams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1004 provide the functionality described above. Storage subsystem 1018 may also provide a repository for storing data used in accordance with the present disclosure.

As depicted in the example in FIG. 10, storage subsystem 1018 can include various components including a system memory 1010, computer-readable storage media 1022, and a computer readable storage media reader 1020. System memory 1010 may store program instructions that are loadable and executable by processing unit 1004. System memory 1010 may also store data that is used during the execution of the instructions and/or data that is generated during the execution of the program instructions. Various different kinds of programs may be loaded into system memory 1010 including but not limited to client applications, Web browsers, mid-tier applications, relational database management systems (RDBMS), virtual machines, containers, etc.

System memory 1010 may also store an operating system 1016. Examples of operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1000 executes one or more virtual machines, the virtual machines along with their guest operating systems (GOSs) may be loaded into system memory 1010 and executed by one or more processors or cores of processing unit 1004.

System memory 1010 can come in different configurations depending upon the type of computer system 1000. For example, system memory 1010 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1010 may include a basic input/output system (BIOS) containing basic routines that help to transfer information between elements within computer system 1000, such as during start-up.

Computer-readable storage media 1022 may represent remote, local, fixed, and/or removable storage devices plus storage media for temporarily and/or more permanently containing, storing, computer-readable information for use by computer system 1000 including instructions executable by processing unit 1004 of computer system 1000.

Computer-readable storage media 1022 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Machine-readable instructions executable by one or more processors or cores of processing unit 1004 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   receiving, by a computer system, a request to replicate resources from a primary region data center to a secondary region data center;
   obtaining, by the computer system, information about the resources at the primary region data center;
   creating, by the computer system, an executable configuration file utilizing the information about the resources at the primary region data center;
   adding, by the computer system, one or more entries to a correspondence table utilizing the information about the resources at the primary region data center and second resources at the secondary region data center;
   creating, by the computer system, a transformed executable configuration file utilizing the executable configuration file and the correspondence table; and
   executing, by the computer system, the transformed executable configuration file at the secondary region data center to implement one or more resources at the secondary region data center.

2. The computer-implemented method of claim 1, wherein the one or more resources implemented at the secondary region data center replicate the resources at the primary region data center.

3. The computer-implemented method of claim 1, comprising, prior to creating the transformed executable configuration file, obtaining, by the computer system, information about the second resources at the secondary region data center.

4. The computer-implemented method of claim 1, comprising:
   obtaining, by the computer system, updated information about the second resources at the secondary region data center; and
   updating, by the computer system, one or more entries within the correspondence table utilizing the updated information about the resources at the secondary region data center.

5. The computer-implemented method of claim 1, wherein the information about the resources includes one or more characteristics of the resources, the one or more characteristics including local identifiers used within the primary region data center to identify the resources.

6. The computer-implemented method of claim 1, wherein the information about the resources includes a configuration of the resources, the configuration of the resources including existing relationships between the resources.

7. The computer-implemented method of claim 1, wherein the executable configuration file describes characteristics of the resources within the primary region data center as well as a configuration of the resources within the primary region data center.

8. The computer-implemented method of claim 1, wherein the executable configuration file includes only a difference between a current configuration of resources within the primary region data center and an earlier configuration of resources within the primary region data center.

9. The computer-implemented method of claim 1, wherein the secondary region data center includes a region implemented during a failover action in response to a failure of the primary region data center.

10. The computer-implemented method of claim 1, wherein the correspondence table includes a symbol table.

11. The computer-implemented method of claim 1, comprising creating, by the computer system, an entry within the correspondence table for each resource within the primary region data center that is to be replicated.

12. The computer-implemented method of claim 1, wherein each of the one or more entries added to the correspondence table includes:
   a primary region identifier used within the primary region data center to identify a resource;
   a generic resource identifier created for the resource within the correspondence table;
   a type of the resource;
   a disaster recovery state of the resource; and
   one or more disaster recovery policies associated with the resource.

13. The computer-implemented method of claim 1, wherein creating the transformed executable configuration file includes:
   identifying, by the computer system, a primary region identifier within the executable configuration file; and
   substituting, by the computer system, a generic resource identifier for the primary region identifier within the transformed executable configuration file.

14. A system comprising:
   one or more processors configured to:
   receive a request to replicate resources from a primary region data center to a secondary region data center;
   obtain information about the resources at the primary region data center;
   create an executable configuration file utilizing the information about the resources at the primary region data center;
   add one or more entries to a correspondence table utilizing the information about the resources at the primary region data center and second resources at the secondary region data center;
   create a transformed executable configuration file utilizing the executable configuration file and the correspondence table; and
   execute the transformed executable configuration file at the secondary region data center to implement one or more resources at the secondary region data center.

15. The system of claim 14, wherein the one or more resources implemented at the secondary region data center replicate the resources at the primary region data center.

16. The system of claim 14, wherein the one or more processors are further configured to, prior to creating the transformed executable configuration file, obtain information about the second resources at the secondary region data center.

17. The system of claim 14, wherein the one or more processors are further configured to:
   obtain updated information about the second resources at the secondary region data center; and
   update one or more entries within the correspondence table utilizing the updated information about the resources at the secondary region data center.

18. The system of claim 14, wherein the information about the resources includes one or more characteristics of the resources, the one or more characteristics including local identifiers used within the primary region data center to identify the resources.

19. The system of claim 14, wherein the information about the resources includes a configuration of the resources, the configuration of the resources including existing relationships between the resources.

20. A non-transitory computer-readable medium storing a set of instructions, the set of instructions when executed by one or more processors cause processing to be performed comprising:
   receiving, by a computer system, a request to replicate resources from a primary region data center to a secondary region data center;
   obtaining, by the computer system, information about the resources at the primary region data center;
   creating, by the computer system, an executable configuration file utilizing the information about the resources at the primary region data center;
   adding, by the computer system, one or more entries to a correspondence table utilizing the information about the resources at the primary region data center and second resources at the secondary region data center;
   creating, by the computer system, a transformed executable configuration file utilizing the executable configuration file and the correspondence table; and
   executing, by the computer system, the transformed executable configuration file at the secondary region data center to implement one or more resources at the secondary region data center.

\* \* \* \* \*

UNITED STATES PATENT AND TRADEMARK OFFICE
CERTIFICATE OF CORRECTION

PATENT NO. : 12,229,026 B2
APPLICATION NO. : 17/974369
DATED : February 18, 2025
INVENTOR(S) : Sahoo et al.

Page 1 of 1

It is certified that error appears in the above-identified patent and that said Letters Patent is hereby corrected as shown below:

On the Title Page

Column 2, under item (57) abstract, Line 6, delete "for to" and insert -- for --, therefor.

In page 2, Column 1, under item (56) Other Publications, Line 2, delete "/11/" and insert -- /v11/ --, therefor.

In page 2, Column 2, under item (56) Other Publications, Line 17, delete "Managementusing" and insert -- Management using --, therefor.

In page 2, Column 2, under item (56) Other Publications, Line 18, delete ".ncinl." and insert -- .ncirl. --, therefor.

In the Specification

In Column 1, Line 46, delete "for to" and insert -- for --, therefor.

In Column 2, Line 62, delete "FIGS." and insert -- figures --, therefor.

Signed and Sealed this
Twentieth Day of May, 2025

Coke Morgan Stewart
*Acting Director of the United States Patent and Trademark Office*